(No Model.)

R. J. OLIVEY.
MODE OF OPERATING BELTS AND PULLEYS.

No. 289,440. Patented Dec. 4, 1883.

Witnesses.
J. W. Caldwell
James Sangster

Inventor.
Richard J. Olivey
By James Sangster
Atty.

UNITED STATES PATENT OFFICE.

RICHARD J. OLIVEY, OF BUFFALO, NEW YORK.

MODE OF OPERATING BELTS AND PULLEYS.

SPECIFICATION forming part of Letters Patent No. 289,440, dated December 4, 1883.

Application filed October 10, 1883. (No model.)

*To all whom it may concern:*

Be it known that I, RICHARD J. OLIVEY, a citizen of the United States, residing in Buffalo, in the county of Erie and State of New York, have invented certain new and useful Improvements in Mode of Operating Belts and Pulleys, of which the following is a specification.

The object of my invention is to provide the means for operating two pairs of rollers and two pairs of pulleys by means of one belt, when one pair of pulleys are in a line back of the other, or in a line on one side of the plane of the other pair of pulleys, as will be fully and clearly hereinafter shown by reference to the accompanying drawings, in which—

Figure 1:
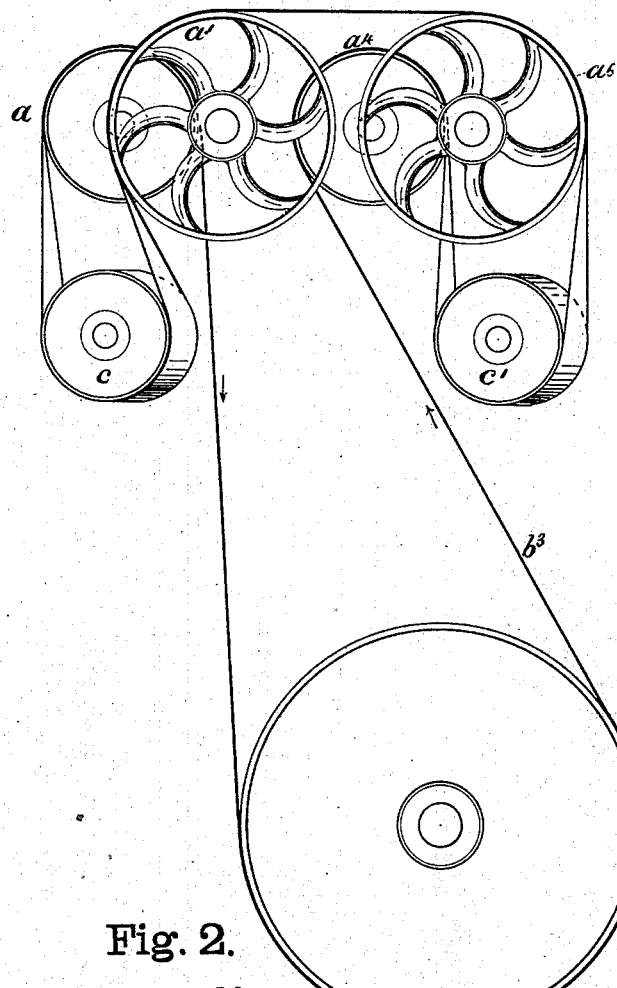
Figure 2:
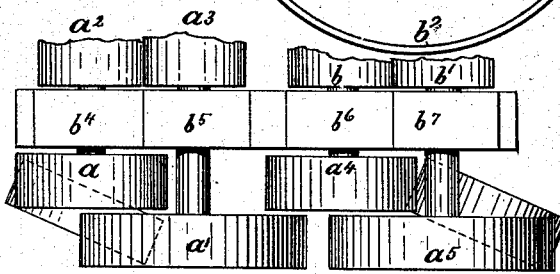

Figure 1 is a side elevation, showing the arrangement of the pulleys and the single belt for operating the whole series of pulleys and giving to each their proper movements; and Fig. 2 is a plan or top view of the pulleys without the belt, showing also a portion of the rollers to which they may be connected.

$a$ $a'$ represent one set of pulleys for operating one set of rollers, $a^2$ $a^3$, the pulley $a$ being set in a plane back of the other pulley.

$a^4$ $a^5$ represent the second set of pulleys, one of which is also set to one side of the other. They are connected with and operate the rollers $b$ $b'$.

$b^2$ is the driving-pulley, and $b^3$ is the belt. The pulleys are set in bearings $b^4$ $b^5$ $b^6$ $b^7$, in the usual way, which bearings are well known and in common use. Consequently a further description is not required here.

$c$ represents a pulley set diagonally, so that the center of the periphery comes in the center of the pulleys $a$ $a'$.

$c'$ is another pulley, set diagonally, so that a center line around the periphery will be in a line with a similar line in the center of the faces of the pulleys $a^4$ $a^5$. The object of these diagonally-arranged pulleys is to carry the belt from the pulley $a$ to the pulley $a'$, and from the pulley $a^4$ to $a^5$. The belt, in operating, passes up from the driving-pulley to the pulley $a^4$, then down around the pulley $c'$, and from thence up and over the pulleys $a^5$ $a'$. It then passes down under around the diagonally-arranged pulley $c$, and from thence up and around the pulley $a$, and then down to and around the driving-pulley $b^2$ to the starting-point. This arrangement of pulleys and belt will run either way, and the belt will still keep its place upon the pulleys.

I have another application in the office for running one set of rollers, in which a pulley is arranged diagonally for carrying the belt from one pulley to another, arranged in different places. I therefore do not claim such, broadly; but What I do claim is—

The pulleys $a$ $a'$ $a^4$ $a^5$, the pulleys $a$ $a^4$ being in a plane back of the other, in combination with the two diagonally-arranged pulleys $c$ $c'$, a driving-pulley, and a single belt for giving the proper movements to the two sets of pulleys, substantially as described.

RICHARD J. OLIVEY.

Witnesses:
   J. N. CALDWELL,
   JAMES SANGSTER.